United States Patent Office 3,056,758
Patented Oct. 2, 1962

3,056,758
BUTADIENE POLYMER LATEX TREATED WITH A CROSS-LINKED POLYVINYL METHYL ETHER
Louis H. Howland, Watertown, and Leland E. Dannals, Waterbury, Conn., assignors to United States Rubber Company, New York, N.Y., a corporation of New Jersey
No Drawing. Filed Mar. 10, 1960, Ser. No. 13,996
16 Claims. (Cl. 260—29.7)

This invention relates to increasing the particle size of synthetic rubber latices, and particularly to permit them to be concentrated to fluid latices of high solids content.

It is known that the incorporation of alkali salt electrolytes in synthetic rubber latices will cause an increase in the particle size of such synthetic rubber latices, and that it is necessary to increase the particle size of synthetic rubber latices if the latices are to be concentrated to fluid high solids latices. The Howland et al. U.S. application Serial No. 5,097, filed January 28, 1960, which is a continuation-in-part of applications Serial Nos. 776,668, and now abandoned, and 776,762, filed November 28, 1958, and now abandoned, discloses that the increase in particle size of a synthetic rubber latex by the incorporation in the latex of 0.2% to 2% of an alkali salt electrolyte based on the latex solids is much greater if polyvinyl methyl ether is also added to the latex. The polyvinyl methyl ether of itself, that is in the absence of such alkali salt electrolyte does not increase the particle size of the latex.

According to the present invention, polyvinyl methyl ether is treated so that it will of itself increase the particle size of a synthetic rubber latex, and will also give a greatly increased particle size latex in the presence of alkali salt electrolytes as compared to untreated polyvinyl methyl ether in the presence of alkali salt electrolytes.

In carrying out the present invention, the polyvinyl methyl ether is cross-linked before being added to the synthetic rubber latex. Such polyvinyl methyl ether of increased cross linking will itself increase the particle size of synthetic rubber latices and permit concentrating the latices to higher solids content while retaining the desired fluidity, and will also permit reducing the amount of polyvinyl methyl ether and alkali salt electrolyte when used.

Polyvinyl methyl ethers are generally graded by specific viscosity, which is a measure of average molecular weight. Polyvinyl methyl ethers having a specific viscosity from 0.015 to 1.1, which corresponds to average molecular weights in the range from 160 to 6000, may be used in the present invention. The preferred polyvinyl methyl ethers are those having specific viscosities between 0.1 and 1.1, which corresponds to molecular weights in the range from 4000 to 6000. Various treatments may be utilized to increase the cross linking of the polyvinyl methyl ether, and these will be illustrated in the examples. Preferably the treatment comprises heating the polyvinyl methyl ether, with or without an acidic material such as sulfuric, hydrochloric or acetic acid, or ferric chloride. That such treatment to increase the cross linking of the polyvinyl methyl ether may also be accompanied by a change in molecular weight is not important, since the increase in cross linking is clearly shown to increase the effectiveness of the polyvinyl methyl ether as an agglomeration promoter.

The increase in cross linking of the polyvinyl methyl ether is shown by the decrease in the amount of n-heptane that is necessary to precipitate the polyvinyl methyl ether from a benzene solution of the polyvinyl methyl ether. Polyvinyl methyl ether is soluble in benzene but insoluble in n-heptane. Cross linking of the polyvinyl methyl ether reduces the solubility in solvents and this is shown in the decreased amounts of n-heptane required to precipitate the polyvinyl methyl ether from a benzene solution as the cross linking is increased. A convenient way to follow the increase in cross linking is by a so-called "heptane ratio" of the polyvinyl methyl ether. The heptane ratio is the weight in grams of n-heptane required to cause incipient precipitation, at 25° C., of polyvinyl methyl ether from 1 gram of a solution of polyvinyl methyl ether in benzene in which the concentration is 1 g./100 cc. In the examples below, the heptane ratio is determined by placing 5 cc. (4.4 g.) of a solution of polyvinyl methyl ether in benzene of a concentration between 1.0 and 1.4 g./100 cc., into each of two 50 cc. beakers. To one of these beakers, 2 cc. (1.75 g.) of benzene is added. These beakers are placed in a 25° C. bath and agitated while n-heptane is added until a thermometer on the far side of the beaker cannot be read. The weight of n-heptane, so used, divided by the weight of the PVM solution is the heptane number for the particular concentration. A linear interpolation at 1 g./100 cc. on a plot of concentration vs. heptane number of these data, yields the heptane ratio as above defined. As will be seen in the examples below, an amount of cross linking that will give a reduction in heptane ratio of as little as 0.1 will give a decided improvement in the agglomeration promoting characteristics of the polyvinyl methyl ether. Where the increase in cross linking is accomplished by heating the polyvinyl methyl ether, with or without the addition of acidic material, the temperature and time of heating is not critical to obtain a reduction in heptane ratio of the polyvinyl methyl ether of at least 0.1. A convenient temperature of treatment as illustrated in the examples may be from about 100° C. to about 250° C. and a convenient time of treatment may be from one hour or less to twenty-four hours or more. The reduction in heptane number may be as much as 1.5. The cross linking of the polyvinyl methyl ether should not be carried to the extent where the polyvinyl methyl ether is not completely soluble in ten times its weight of water at 25° C. The amount of polyvinyl methyl ether of increased cross linking added to the synthetic rubber latex to increase the particle size of the latex is not critical and may be up to 1 part per 100 parts of latex solids. Where the polyvinyl methyl ether is used without alkali salt electrolyte, except the very small amounts of electrolyte that may be present in the latex from the catalysts, activators, sequestering agents, oxygen scavengers, emulsifiers and stabilizers from the polymerization recipe, as little as 0.02 part of polyvinyl methyl ether per 100 parts of latex solids may be used. Where the polyvinyl methyl ether of increased cross linking is incorporated in synthetic rubber latex containing 0.2 to 2 parts of alkali salt electrolyte per 100 parts of latex solids, as little as 0.001 part of polyvinyl methyl ether per 100 parts of latex solids may be used.

Changes in the molecular weight of the polyvinyl methyl ether by the treatment to increase the cross linking may be followed by changes in the specific viscosity of the polyvinyl methyl ether. The specific viscosity is the relative viscosity minus one. The relative viscosity is the value of the absolute viscosity of a solution of the polyvinyl methyl ether over the absolute viscosity of the solvent, determined at 25° C., and using a solution of 1 gram of the polyvinyl methyl ether per 100 cc. of benzene. Lower specific viscosity means lower molecular weight, and higher specific viscosity means higher molecular weight.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The latices will contain dispersing agents from the polymerization generally in amount from 2% to 10% by weight of the solids of the latex of one or a mixture of anionic surface-active dispersing agents. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compounds having the general formula $R-SO_3M$ or $R-OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. Additional such anionic surface-active dispersing agents, generally in amount not more than 3.0 parts per 100 parts of solids of the latex, may be added to the latex before increasing the particle size according to the present invention to assure stability to the latex on particle size enlargement, and on concentrating the latex. The latex will conventionally have a solids content of 20% to 50%, and after the addition of the polyvinyl methyl ether of increased cross linking, the latex may readily be concentrated to a solids content of 60% to 75%, giving a fluid high solids latex. The latex may be concentrated by increasing the solids content in known manner as by creaming with a vegetable mucilage, such as ammonium alginate. It is preferred, however, to increase the solids content by evaporation concentration.

Where the polyvinyl methyl ether of increased cross linking is added to a synthetic rubber latex containing 0.2 to 2 parts of alkali salt electrolyte, such alkali metal salt may be present in the latex from the polymerization recipe or may be added before, or with or after the polyvinyl methyl ether, or may in part be present from the polymerization recipe and in part be added before, with or after the polyvinyl methyl ether. The amount of alkali salt electrolyte used is generally 0.05% to 2% and the amount of polyvinyl methyl ether of increased cross linking used is generally 0.01% to 1% based on the solids of the latex. The alkali salt may be an alkali (potassium, sodium, ammonium or amine) salt of an acid such as carbonic, formic, acetic, sulfuric, hydrochloric, nitric or phosphoric acids. Examples of alkali salt electrolytes that may be used in the present invention are ammonium carbonate, ammonium bicarbonate, methyl amine carbonate, dimethyl amine carbonate, sodium formate, potassium acetate, sodium sulfate, potassium sulfate, sodium chloride, potassium chloride, sodium nitrate and trisodium phosphate. The following examples illustrate the invention. All parts and percentages referred to herein are by weight.

*Example 1*

A latex was prepared by polymerizing for 6 hours at 41° F. to 80% conversion a recipe consisting of 150 parts of water, 70 parts of butadiene-1,3, 30 parts of styrene, 3.25 parts of potassium oleate, 1.75 parts of potassium dispropportionated rosin soap, 0.5 part of the condensation product of sodium naphthalene sulfonate and formaldehyde, 0.2 part of diisopropyl benzene hydroperoxide, 0.1 part of sodium formaldehyde sulfoxylate, 0.02 part of ferrous sulfate heptahydrate, 0.08 part of the tetrasodium salt of ethylene diamine tetraacetic acid, 0.03 part of sodium dithionite, and 0.1 part of tertiary dodecyl mercaptan. After polymerization, residual butadiene was vented off and residual styrene was removed by steam distillation. The solids concentration of the latex was 35.2%, and the average particle diameter was 800 Angstrom units.

The polyvinyl methyl ether (hereinafter in the examples called PVM) had a heptane ratio of 3.24 and a specific viscosity of 0.35 before treatment. A 50% aqueous solution of the PVM was heated in a single bladed mixer at temperatures up to 90° C. to drive off the water. When the water was driven off, a 10% aqueous solution of ferric chloride was added in amount to give 0.25% of ferric chloride based on the PVM. The mixture was heated four hours in the mixer, the temperature rising to about 120° C. The mixture was cooled to about 90° C. and diluted with water to reduce the viscosity to a convenient fluidity for handling. The thus treated PVM had a heptane ratio of 2.01 and a specific viscosity of 0.50.

A sample of the latex without addition of PVM and a sample of the latex to which 0.1% of the above treated PVM based on the latex solids had been added as a 1% aqueous solution were concentrated in a laboratory disc concentrator at 55° C. to 60° C. to high viscosity. The latex to which no PVM had been added was concentrated to 46.2% solids content at a viscosity of 7160 centipoises (measured on a Brookfield viscometer), and had an average particle diameter of 800 Angstrom units. The latex to which the treated PVM had been added was concentrated to 63.3% solids concentration at a viscosity of 5930 centipoises, and had an average particle diameter of 3100 Angstrom units. The above illustrates the great increase in particle size of synthetic rubber latex on addition of polyvinyl methyl ether treated according to the present invention to a latex containing no alkali salt electrolyte in addition to the very small amount of electrolyte that may be present in the latex from catalysts, activators, sequestering agents, oxygen scavengers, emulsifiers and stabilizers from the polymerization recipe.

By comparison, there is no increase in particle size of a synthetic rubber latex on addition of untreated polyvinyl methyl ether alone to a latex containing no alkali salt electrolyte except that very small amount of electrolyte that may be present in the latex from catalysts, activators, sequestering agents, oxygen scavengers, emulsifiers and stabilizers from the polymerization recipe. This is shown in the following:

A latex was prepared by polymerizing for seven hours at 41° F. to 80% conversion the same recipe as above, and removing unreacted monomers. The solids concentration of the latex was 31.4% and the average particle diameter was 640 Angstrom units. The untreated PVM used had a specific viscosity about 0.4. A sample of the latex without addition of PVM, and two samples of the latex to which 0.25% and 1%, respectively, of the untreated PVM based on the latex solids had been added were concentrated in a laboratory disc concentrator at 55° C. to 60° C. to as high a solids content as possible. The latex to which no PVM had been added was concentrated to 43.6% solids content at a viscosity of 8070 centipoises, and had an average particle diameter of 660 Angstrom units. The latex to which the 0.25% of the untreated PVM had been added was concentrated to 44.4% solids content at a viscosity of 10,000 centipoises and had an average particle diameter of 640 Angstrom units. The latex to which the 1% of untreated PVM had been added was concentrated to 46.2% solids content at a viscosity of 10,000 centipoises, and had an average particle diameter of 690 Angstrom units. This shows that the addition of untreated polyvinyl methyl ether alone to a synthetic rubber latex in the absence of added alkali salt electrolyte does not increase the particle size of the latex.

*Example 2*

The latex used in this example was prepared by polymerizing for 7½ hours at 41° F. to 80% conversion the recipe of Example 1 with 0.2 part of potassium sulfate added to the recipe. The solids concentration of the latex was 29.3%, and the average particle diameter was 910 Angstrom units.

A sample of the latex without addition of PVM and a sample of the latex to which 0.02% of the treated PVM of Example 1 based on the latex solids had been added as a 1% aqueous solution were concentrated in a laboratory disc concentrator at 55° C. to 60° C. to a high viscosity. The latex to which no PVM had been added was concentrated to 46.5% solids content at a viscosity (measured on a Brookfield viscometer) of 4980 centipoises, and had an average particle diameter of 1070 Angstrom units. The latex to which the treated PVM had been added was concentrated to 61.4% solids content at a viscosity of 2440 centipoises, and had an average particle diameter of 2750 Angstrom units. This example illustrates the great increase in particle size of synthetic rubber latex containing alkali salt electrolyte from the polymerization recipe by addition of polyvinyl methyl ether treated according to the present invention.

*Example 3*

The latex used in this example was prepared by polymerizing for 15¾ hours at 41° F. to 80% conversion the recipe of Example 1 with 0.5 part of potassium sulfate added to the recipe. The solids concentration of the latex was 36.5%, and the average particle diameter was 750 Angstrom units.

A sample of the latex without addition of PVM or potassium sulfate and a sample of the latex to which 0.5% of potassium sulfate and 0.005% of the treated PVM of Example 1 based on the solids of the latex had been added were concentrated in a laboratory disc concentrator at 55° C. to 60° C. to a high viscosity. The latex to which no PVM or potassium sulfate had been added was concentrated to 52.2% solids content at a viscosity (measured on a Brookfield viscometer) of 6990 centipoises, and had an average particle diameter of 750 Angstrom units. The latex to which the treated PVM and potassium sulfate had been added was concentrated to 63.0% solids content at a viscosity of 7010 centipoises, and had an average particle size of 2500 Angstrom units. This example illustrates the great increase in particle size of synthetic rubber latex containing alkali salt electrolyte from the polymerization recipe and from incorporation in the latex by addition of polyvinyl methyl ether according to the present invention.

The latex used in Examples 4 to 11 was a conventional 35% solids content latex of a synthetic rubber copolymer of 70 parts of butadiene-1,3 and 30 parts of styrene containing 4.1 parts of potassium oleate soap and 2.2 parts of potassium disproportionated rosin soap dispersing agents and 0.6 part of a dispersing agent which was the condensation product of sodium naphthalene sulfonate and formaldehyde and 0.6 part of potassium sulfate per 100 parts of latex solids. In Examples 4 to 11, the polyvinyl methyl ethers, treated as described in the examples to increase the cross linking, and the untreated or control polyvinyl methyl ethers, are evaluated as agglomeration promoters by adding them, as a 10% aqueous solution, to 800 g. of the above 35% solid content latex with an amount of potassium oleate equivalent to the polyvinyl methyl ether as a 10% aqueous solution and 1.9 parts per hundred parts of latex solids of the condensation product of sodium naphthalene sulfonate and formaldehyde as a 20% aqueous solution as additional stabilizers, and potassium sulfate as a 10% aqueous solution. The amount of polyvinyl methyl ether and potassium sulfate are variable and are shown in the examples. The latices containing the added stabilizers and polyvinyl methyl ether and potassium sulfate were aged at 190° F. to 200° F. for one hour, and then placed in a laboratory disc concentrator which was operated at 55° C. to 60° C. As the concentration proceeds, the viscosity of the latex increases and would ultimately reach a point where it could no longer be handled as a fluid. The concentrating of the latices in Examples 4 to 11 was stopped when the solids content of the latex was greater than 60% if the latex was not too thick, or at a solids content below 60% where the latex was too thick. The viscosities of the concentrated latices were measured on a Brookfield viscometer and the percent solids determined. These are reported in Examples 4 to 11.

*Example 4*

A 70 gram sample of a 50% aqueous solution of PVM (polyvinyl methyl ether) is placed in a Pyrex crystallizing dish (3″ dia. x 1.5″ high) containing a stirring rod. This is placed under a 375 watt infrared industrial reflector bulb, the transmitting edge of which is 8 inches from the bottom of the dish. With the bulb burning, the PVM clouds out and water begins to evaporate. After 22 minutes the bulb is lowered 2 inches. The PVM is stirred occasionally. After 5 hours, all the water is evaporated and the PVM is becoming more of an orange color. After 7 hours, the lamp is lowered 2 inches and the heating continued at about 200° C. At 11 hours part of the treated PVM was removed, and this together with some of the untreated PVM are evaluated as agglomeration promoters. At 13 hours the PVM is so gelled it will not completely dissolve in water or benzene. The original PVM (control) had a heptane ratio of 2.54 and a specific viscosity of 0.61 whereas the 11 hour treated PVM had a heptane ratio of 1.46 and a specific viscosity of 0.40.

Evaluation of the control PVM and the 11 hour treated PVM gave results shown in the following table. The percents of PVM and $K_2SO_4$ in the tables in this and the following examples are based on the solids of the latex.

| Sample | PVM (Percent) | $K_2SO_4$ (Percent) | Final Solids (Percent) | Viscosity (Centipoises) |
|---|---|---|---|---|
| Control | 0.50 | 1.0 | 55.3 | 5,760 |
| Treated | 0.50 | 1.0 | 64.8 | 6,260 |
| Do | 0.25 | 0.5 | 62.2 | 345 |
| Do | 0.15 | 0.3 | 68.6 | 4,270 |
| Do | 0.10 | 0.2 | 70.2 | 5,260 |
| Do | 0.05 | 0.1 | 68.8 | 2,835 |

*Example 5*

A 250 gram sample of a 50% aqueous solution of PVM is placed in a 600 cc. beaker which contains a stirring rod and thermometer which measures up to 250° C. The beaker is heated on a steam bath and two phases appear since PVM is insoluble in water at elevated temperatures. The fluid water phase is decanted and discarded. The beaker is then heated in a mantle. The remaining water is driven off in about 2½ hours as the temperature holds at 100° C. The PVM is now a clear liquid, the temperature of which reaches 200° C. in about 2½ hours additional heating time. The heating at 200° C. was continued and samples were removed after 2, 4 and 6 hours for the preparation of water and benzene solutions. The original PVM (control) had a heptane ratio of 3.24 and a specific viscosity of 0.35 whereas the PVM heated at 200° C. for 4 hours had a heptane ratio of 2.88 and a specific viscosity of 0.32.

Evaluation of the control PVM and the PVM heated at 200° C. for 2, 4 and 6 hours gave results shown in the following table:

| Sample | PVM (Percent) | K₂SO₄ (Percent) | Final Solids (Percent) | Viscosity (Centipoises) |
|---|---|---|---|---|
| Control | 0.25 | 0.5 | 55.1 | 13,840 |
| Do | 0.35 | 0.7 | 54.1 | 9,520 |
| Do | 0.75 | 1.5 | 54.8 | 4,630 |
| 2 Hours | 0.25 | 0.5 | 72.0 | 8,810 |
| 4 Hours | 0.25 | 0.5 | 67.1 | 2,070 |
| 6 Hours | 0.25 | 0.5 | 70.6 | 7,140 |

*Example 6*

A 40 gram sample of a 50% aqueous solution of PVM is placed in a 250 cc. beaker containing a stirring rod and heated on a steam bath. After 15 minutes, two phases have formed, and about 15 grams of the fluid water phase is decanted and discarded. To the remaining material, 0.2 gram of sulfuric acid (1% based on the PVM) is added. Heating with atmospheric steam is continued for 3 hours with occasional stirring. This treatment decreases heptane ratio from 3.24 to 2.31, and increases the specific viscosity from 0.35 to 0.51.

When the above procedure is repeated except for the replacement of the sulfuric acid with one-fourth as much ferric chloride and for extension of the heating period by one hour, the heptane ratio decreases from 3.24 to 2.88, and the specific viscosity does not change.

Evaluation of the control PVM and the PVM heated with sulfuric acid and ferric chloride gave results shown in the following table:

| Sample | PVM (Percent) | K₂SO₄ (Percent) | Final Solids (Percent) | Viscosity (Centipoises) |
|---|---|---|---|---|
| Control | 0.25 | 0.5 | 55.1 | 13,840 |
| Sulfuric Acid | 0.25 | 0.5 | 78.7 | 10,000 |
| Do | 0.1 | 0.2 | 70.0 | 5,710 |
| Ferric Chloride | 0.25 | 0.5 | 71.3 | 8,740 |

*Example 7*

A 7000 gram sample of a 50% aqueous solution of PVM is placed in a jacketed internal W & P mixer and heated with atmospheric steam in the mixer jacket. Two phases form and most of the water phase is decanted. The remainder of the water phase evaporates. Then 8.7 grams of ferric chloride (0.25% based on the PVM) is added and mixing at 210° F. is continued for four hours. The heptane value decreased from 3.24 to 2.13.

Evaluation of the control PVM and the thus treated PVM gave results shown in the following table:

| Sample | PVM (Percent) | K₂SO₄ (Percent) | Final Solids (Percent) | Viscosity (Centipoises) |
|---|---|---|---|---|
| Control | 0.25 | 0.5 | 55.1 | 13,840 |
| Treated | 0.075 | 0.15 | 71.2 | 6,770 |

*Example 8*

A 50% aqueous solution of PVM is subjected to high energy ionizing radiation by exposure to Van de Graaf radiation so that each pound of PVM receives 2 watt-hours. The heptane ratio is decreased from 2.73 to 2.12, and the specific viscosity is decreased slightly from 0.61 to 0.57. Irradiation at 4 watt-hours per pound causes the PVM to cross link so much that it is not completely soluble in benzene and so has been carried too far.

Evaluation of the control PVM and the treated PVM that was exposed to irradiation at 2 watt-hours per pound gave results shown in the following table:

| Sample | PVM (Percent) | K₂SO₄ (Percent) | Final Solids (Percent) | Viscosity (Centipoises) |
|---|---|---|---|---|
| Control | 0.5 | 1.0 | 55.1 | 8,580 |
| Treated | 0.25 | 0.5 | 70.9 | 6,330 |

*Example 9*

In a 250 cc. round bottom one-neck flask is placed 28.5 grams of a 50% aqueous solution of PVM, 14.5 grams methanol, and three boiling chips. This is swirled to make it homogeneous and 0.48 gram of 70% cumene hydroperoxide is added. The flask is fitted with a water cooled reflux condenser and heated with atmospheric steam. After the system refluxes for twenty minutes, 0.18 gram of glacial acetic acid and 1.16 grams of a 10% aqueous solution of diethylene triamine are added. The reflux is continued for a total of four hours. The PVM is recovered by evaporating methanol and water under vacuum and a heat lamp. The heptane ratio has decreased from 3.24 to 2.23, and the specific viscosity has increased from 0.35 to 0.95.

Evaluation of the control PVM and the thus treated PVM gave results shown in the following table:

| Sample | PVM (Percent) | K₂SO₄ (Percent) | Final Solids (Percent) | Viscosity (Centipoises) |
|---|---|---|---|---|
| Control | 0.25 | 0.5 | 55.1 | 13,840 |
| Treated | 0.25 | 0.5 | 71.9 | 8,780 |

*Example 10*

To 14 grams of a 50% aqueous solution of PVM in a 250 cc. round bottom one-neck flask, 50 cc. of glacial acetic acid is added. A water cooled reflux condenser is attached, and the flask is heated with a mantle so that the solution refluxes for 3 hours and 40 minutes and changes from a yellow to a deep red color. The water and acetic acid are removed at a pressure of 20 mm. Hg while heating the flask in atmospheric steam. The heptane ratio has decreased from 2.54 to 2.35, and the specific viscosity has decreased from 0.61 to 0.54.

Evaluation of the control PVM and the thus treated PVM gave results shown in the following table:

| Sample | PVM (Percent) | K₂SO₄ (Percent) | Final Solids (Percent) | Viscosity (Centipoises) |
|---|---|---|---|---|
| Control | 0.5 | 1.0 | 55.3 | 5,760 |
| Treated | 0.5 | 1.0 | 65.3 | 1,780 |
| Do | 0.25 | 0.5 | 61.9 | 580 |

*Example 11*

To 27.5 grams of a 50% aqueous solution of PVM in a 250 cc. round bottom one-neck flask, 50 cc. of dioxane is added. A water cooled reflux condenser is attached, and the flask is heated with a mantle so that the solution refluxes for 55 minutes. Then 2 drops of concentrated HCl is added and the reflux continues for one hour and 41 minutes during which the solution changes from yellow to deep red. The water and dioxane are removed at a pressure of 20 mm. Hg while heating the flask in atmospheric steam. The heptane ratio has decreased from 2.54 to 2.05, and the specific viscosity has increased from 0.61 to 0.68.

Evaluation of the control PVM and the thus treated PVM gave results shown in the following table:

| Sample | PVM (Percent) | K₂SO₄ (Percent) | Final Solids (Percent) | Viscosity (Centipoises) |
|---|---|---|---|---|
| Control | 0.5 | 1.0 | 55.3 | 5,760 |
| Treated | 0.1 | 0.2 | 65.8 | 1,360 |

The polyvinyl methyl ether treated according to the present invention may be incorporated in the synthetic rubber latex, which may or may not contain alkali salt electrolyte, before removing unreacted residual monomers to further increase the particle size of the latex. The incorporation in a synthetic rubber latex of polyvinyl methyl ether treated according to the present invention may be in addition to other known ways of increasing the particle size of the latex besides incorporating alkali salt electrolyte in the latex. For example, the treated polyvinyl methyl ether may be incorporated in a synthetic rubber latex containing a water-soluble soap emulsifier and the pH of the latex reduced and then raised, or the treated polyvinyl methyl ether may be added to a latex and the latex then frozen and thawed.

This application is a continuation-in-part of our application Serial No. 822,432, filed June 24, 1959, and now abandoned.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 which comprises incorporating in the latex up to 1% based on the solids of the latex of polyvinyl methyl ether that after formation has been cross-linked, the amount of cross-linking being that amount which reduces the heptane ratio of the polyvinyl methyl ether at least 0.1, the heptane ratio being the weight in grams of n-heptane required to cause incipient precipitation, at 25° C., of polyvinyl methyl ether from 1 gram of a solution of polyvinyl methyl ether in benzene in which the concentration is 1 g./100 cc., the cross-linked polyvinyl methyl ether being completely soluble in ten times its weight of water at 25° C.

2. The method of increasing the size of the dispersed polymer particles in a synthetic rubber latex aqueous emulsion polymerizate of a mixture of butadiene-1,3 and styrene which comprises incorporating in the latex up to 1% based on the solids of the latex of polyvinyl methyl ether that after formation has been cross-linked, the amount of cross-linking being that amount which reduces the heptane ratio of the polyvinyl methyl ether at least 0.1, the heptane ratio being the weight in grams of n-heptane required to cause incipient precipitation, at 25° C., of polyvinyl methyl ether from 1 gram of a solution of polyvinyl methyl ether in benzene in which the concentration is 1 g./100 cc., the cross-linked polyvinyl methyl ether being completely soluble in ten times its weight of water at 25° C.

3. The method of increasing the size of the dispersed polymer particles in a synthetic rubber latex aqueous emulsion polymerization of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3, said latex containing 0.2% to 2% of an alkali salt electrolyte based on the solids of the latex, which comprises incorporating in the latex up to 1% based on the solids of the latex of polyvinyl methyl ether that after formation has been cross-linked, the amount of cross-linking being that amount which reduces the heptane ratio of the polyvinyl methyl ether at least 0.1, the heptane ratio being the weight in grams of n-heptane required to cause incipient precipitation, at 25° C., of polyvinyl methyl ether from 1 gram of a solution of polyvinyl methyl ether in benzene in which the concentration is 1 g./100 cc., the cross-linked polyvinyl methyl ether being completely soluble in ten times its weight of water at 25° C.

4. The method of increasing the size of the dispersed polymer particles in a synthetic rubber latex aqueous emulsion polymerizate of a mixture of butadiene-1,3 and styrene, said latex containing 0.2% to 2% of an alkali salt electrolyte based on the solids of the latex, which comprises incorporating in the latex up to 1% based on the solids of the latex of polyvinyl methyl ether that after formation has been cross-linked, the amount of cross-linking being that amount which reduces the heptane ratio of the polyvinyl methyl ether at least 0.1, the heptane ratio being the weight in grams of n-heptane required to cause incipient precipitation, at 25° C., of polyvinyl methyl ether from 1 gram of a solution of polyvinyl methyl ether in benzene in which the concentration is 1 g./100 cc., the cross-linked polyvinyl methyl ether being completely soluble in ten times its weight of water at 25° C.

5. The method as defined in claim 1 in which the polyvinyl methyl ether has been cross-linked by being heated at 100° C. to 250° C.

6. The method as defined in claim 1 in which the polyvinyl methyl ether has been cross-linked by treatment with ferric chloride.

7. The method as defined in claim 1 in which the polyvinyl methyl ether has been cross-linked by treatment with an acid selected from the group consisting of sulfuric, hydrochloric and acetic acids.

8. The method as defined in claim 1 in which the polyvinyl methyl ether has been cross-linked by being subjected to high energy ionizing radiation.

9. The method as defined in claim 1 in which the polyvinyl methyl ether has been cross-linked by treatment with cumene hydroperoxide.

10. The method of making a concentrated synthetic rubber latex which comprises incorporating in a synthetic rubber latex up to 1% based on the solids of the latex of polyvinyl methyl ether that after formation has been cross-linked, the amount of cross-linking being that amount which reduces the heptane ratio of the polyvinyl methyl ether at least 0.1, the heptane ratio being the weight in grams of n-heptane required to cause incipient precipitation, at 25° C., of polyvinyl methyl ether from 1 gram of a solution of polyvinyl methyl ether in benzene in which the concentration is 1 g./100 cc., the cross-linked polyvinyl methyl ether being completely soluble in ten times its weight of water at 25° C., said synthetic rubber latex being an aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 and having a solids content of 20% to 50%, and then increasing the solids content of the latex to within the range of 60% to 75%.

11. The method of making a concentrated synthetic rubber latex which comprises incorporating in a synthetic rubber latex up to 1% based on the solids of the latex of polyvinyl methyl ether that after formation has been cross-linked, the amount of cross-linking being that amount which reduces the heptane ratio of the polyvinyl methyl ether at least 0.1, the heptane ratio being the weight in grams of n-heptane required to cause incipient precipitation, at 25° C., of polyvinyl methyl ether from 1 gram of a solution of polyvinyl methyl ether in benzene in which the concentration is 1 g./100 cc., the cross-linked polyvinyl methyl ether being completely soluble in ten times its weight of water at 25° C., said synthetic rubber latex being an aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 and having a solids content of 20% to 50%, and containing 0.2% to 2% of an alkali salt electrolyte based on the solids of the latex and then increasing the solids content of the latex to within the range of 60% to 75%.

12. The method as defined in claim 11 in which the polyvinyl methyl ether has been cross-linked by heating at 100° C. to 250° C.

13. The method as defined in claim 11 in which the polyvinyl methyl ether has been cross-linked by treatment with ferric chloride.

14. The method as defined in claim 11 in which the polyvinyl methyl ether has been cross-linked by treatment with an acid selected from the group consisting of sulfuric, hydrochloric and acetic acids.

15. The method as defined in claim 11 in which the polyvinyl methyl ether has been cross-linked by being subjected to high energy ionizing treatment.

16. The method as defined in claim 11 in which the polyvinyl methyl ether has been cross-linked by treatment with cumene hydroperoxide.

References Cited in the file of this patent

UNITED STATES PATENTS

| | | |
|---|---|---|
| 2,138,073 | Schweitzer | Nov. 29, 1938 |
| 2,444,801 | Arundale | July 6, 1948 |
| 2,839,483 | Howland et al. | June 17, 1958 |
| 2,842,606 | Stoner et al. | July 8, 1958 |
| 2,894,921 | Jones | July 14, 1959 |
| 2,923,692 | Ackerman | Feb. 2, 1960 |

OTHER REFERENCES

Duffey: "Industrial and Eng. Chem.," volume 50, No. 9, September 1958, page 1272.